(12) United States Patent
Khalid et al.

(10) Patent No.: US 11,503,487 B2
(45) Date of Patent: Nov. 15, 2022

(54) EFFICIENT COLLECTION AND COMMUNICATION OF WIRELESS DATA

(71) Applicant: Charter Communications Operating, LLC, St. Louis, MO (US)

(72) Inventors: Saran Khalid, Denver, CO (US); Perwaiz Akhtar, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 310 days.

(21) Appl. No.: 16/700,119

(22) Filed: Dec. 2, 2019

(65) Prior Publication Data
US 2021/0168639 A1    Jun. 3, 2021

(51) Int. Cl.
*H04W 24/10* (2009.01)
*H04W 88/04* (2009.01)

(52) U.S. Cl.
CPC ............ *H04W 24/10* (2013.01); *H04W 88/04* (2013.01)

(58) Field of Classification Search
CPC ............................... H04W 24/10; H04W 88/04
USPC ....................................................... 370/252
See application file for complete search history.

(56) References Cited

U.S. PATENT DOCUMENTS

| | | | | |
|---|---|---|---|---|
| 2014/0194068 | A1* | 7/2014 | Coppage | H04W 24/08 455/67.11 |
| 2015/0215784 | A1* | 7/2015 | Gunasekara | H04L 63/102 455/411 |
| 2019/0319814 | A1* | 10/2019 | Das | H04W 16/14 |
| 2020/0092712 | A1* | 3/2020 | Zhao | H04L 67/303 |
| 2020/0169339 | A1* | 5/2020 | Patel | H04W 16/20 |
| 2021/0344467 | A1* | 11/2021 | Hooli | H04W 88/04 |

FOREIGN PATENT DOCUMENTS

WO    WO-2012015698 A1 *  2/2012 ........... H04W 52/243

\* cited by examiner

*Primary Examiner* — Mohammad S Anwar
(74) *Attorney, Agent, or Firm* — Armis IP Law, LLC

(57) ABSTRACT

A wireless network environment includes multiple wireless stations (such as fixed wireless access points or customer premises equipment), a wireless network of one or more wireless base stations, and a communication management resource. A first wireless station establishes a first wireless link with the wireless network. A second wireless station establishes a second wireless link with the wireless network. Additionally, the first wireless station establishes second wireless connectivity providing a direct connection (wireless communication link) between the first wireless station and the second wireless station. Via the second wireless connectivity, the first wireless station receives data from the second wireless station. The first wireless station communicates the received data over the first wireless connectivity from the first wireless station to a communication management resource. The received data includes any suitable data such as performance metrics associated with the second wireless station and/or the second wireless link.

31 Claims, 9 Drawing Sheets

900

ESTABLISH FIRST WIRELESS CONNECTIVITY SUPPORTING: I) A FIRST WIRELESS LINK BETWEEN A FIRST WIRELESS STATION AND A WIRELESS NETWORK, AND II) A SECOND WIRELESS LINK BETWEEN A SECOND WIRELESS STATION AND THE WIRELESS NETWORK — 910

AT THE FIRST WIRELESS STATION, RECEIVE FIRST DATA TRANSMITTED FROM THE SECOND WIRELESS STATION OVER SECOND WIRELESS CONNECTIVITY ESTABLISHED DIRECTLY BETWEEN THE FIRST WIRELESS STATION AND THE SECOND WIRELESS STATION — 920

COMMUNICATE THE FIRST DATA OVER THE FIRST WIRELESS LINK FROM THE FIRST WIRELESS STATION TO A COMMUNICATION MANAGEMENT RESOURCE — 930

EFFICIENT COLLECTION AND COMMUNICATION OF WIRELESS DATA

BACKGROUND

Conventional wireless systems support different types of wireless connectivity. For example, conventional wireless systems support so-called fixed wireless access (FWA) connectivity between a wireless base station and so-called customer premises equipment. Fixed wireless access is a cost effective option to provide broadband wireless services in rural areas requiring minimal equipment and effort to install compared to alternative implementations including hardwired networks (such as coaxial cable, optical fiber, etc.).

BRIEF DESCRIPTION OF EMBODIMENTS

Embodiments herein provide improved implementation of wireless access points and general use of limited wireless bandwidth in a network environment.

More specifically, one embodiment herein includes multiple wireless stations (such as fixed wireless access points), a wireless network of one or more wireless base stations, and a communication management resource. A first wireless station establishes wireless connectivity (such as a first wireless communication link) with the wireless network. A second wireless station establishes wireless connectivity (such as a second wireless communication link) with the wireless network. The first wireless station further establishes second wireless connectivity providing a direct connection (for example, wireless communication link such as a device-to-device wireless connection) between the first wireless station and the second wireless station. Via the second wireless connectivity (device-to-device connectivity), the first wireless station receives first data from the second wireless station. The second wireless station communicates the first data over the first wireless communication link from the first wireless station through the wireless network to a communication management resource.

In one embodiment, the first data (from the second wireless station) includes performance metrics associated with the second wireless link between a second wireless station and the wireless network.

Further embodiments herein include, at the first wireless station, collecting second data. In one embodiment, the second data is associated with the first wireless link between the first wireless station and the wireless network. The second data can be any suitable data such as wireless settings, performance metrics, etc., associated with the second wireless link. In addition to communicating the first data (associated with the second wireless communication link) through the wireless network to the communication management resource, the first wireless station communicates the second data (associated with the first wireless communication link) over the first wireless link to the communication management resource. In such an instance, via communication of the first data and the second data, the first wireless station apprises the communication management resource of attributes (such as wireless settings, performance metrics, etc.) associated with both the first wireless communication link and the second wireless communication link.

In yet further example embodiments, the first wireless link is a first wireless access link established between a first fixed wireless station and a first wireless base station in the wireless network; the second wireless link is a second wireless access link established between a second fixed wireless station and a second wireless base station in the wireless network. The first wireless station (such as first customer premises equipment) provides a first subscriber domain of multiple communication devices access to a remote wireless network such as the Internet; the second wireless station (such as second customer premises equipment) provides a second subscriber domain of multiple communication devices access to the remote network such as the Internet.

In accordance with further embodiments, the first data received by the communication management resource from the second wireless station indicates attributes of the second wireless link. Based on processing of data (such as performance metrics or other suitable data) associated with each of the wireless links, the communication management resource generates a notification from the communication management resource to the first wireless station; the notification indicates how to adjust settings and/or attributes associated with the first wireless communication link. In one embodiment, the communication management resource communicates the notification (such as control information) to a base station management resource. The base station management resource implements adjustments and/or controls attributes of the first wireless communication link in accordance with the notification. This can include communicating control settings from the base station (control) management resource to the first wireless station, second wireless station, etc. Thus, in one embodiment, the communication management resource as described herein controls transmission of communications over the second wireless communication link between the second wireless station and the wireless network based on processing of the first data.

In yet further embodiments, the first wireless station receives data (such as connectivity data, pathloss information, wireless channel interference information, scheduled grant information, transmit/receive power information, performance metrics, bandwidth information, latency information, jitter information, etc.) from one or more wireless stations other than the second wireless station. For example, in one embodiment, a third wireless station is in communication with the wireless network over a third wireless link. The first wireless station receives second data transmitted from the third wireless station over supplemental wireless connectivity established directly between the first wireless station and the third wireless station. In a similar manner as previously discussed, the first wireless station communicates the first data, second data, etc., over the first wireless link and wireless network to the communication management resource.

As previously discussed, the data collected and communicated from the first wireless station (which collects connectivity data from one or more other wireless stations) can include any suitable information. In one embodiment, the first data communicated by the first wireless station over the wireless network includes performance metrics associated with the second wireless link between the second wireless station and the wireless network; the second data includes performance metrics associated with the third wireless link between the third wireless station and the wireless network. Thus, the first wireless station can be configured to communicate connectivity data, performance information, etc., associated with any number of wireless stations to the remote communication management resource over the first wireless communication link.

In accordance with still further embodiments, based on processing of the connectivity data (such as first data and second data as previously discussed), associated with multiple wireless stations in the network, the communication management resource performs operations such as scheduling of first communications between the first wireless station and the wireless network, scheduling of second communications between the third wireless station and the wireless network, and so on. More specifically, in one embodiment, based on processing of the first data and the second data, the communication management resource schedules: i) first communications between the first wireless station and the wireless network, and ii) second communications between the third wireless station and the wireless network.

Embodiments herein are useful over conventional techniques. For example, supplemental connectivity (such as device-to-device) between wireless stations as described herein support improved use of available wireless bandwidth in a network environment, increasing overall efficiency and data throughput.

Note that any of the resources as discussed herein can include one or more computerized devices, mobile communication devices, sensors, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon. The instructions, when executed by the computer processor hardware, cause the computer processor hardware (such as one or more co-located or disparately processor devices or hardware) to: establish first wireless connectivity supporting: i) a first wireless link between a first wireless station and a wireless network, and ii) a second wireless link between a second wireless station and the wireless network; at the first wireless station, receive first data transmitted from the second wireless station over second wireless connectivity established directly between the first wireless station and the second wireless station; and communicate the first data over the first wireless link from the second wireless station over the wireless network to a management resource.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing improved wireless connectivity in a network environment. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
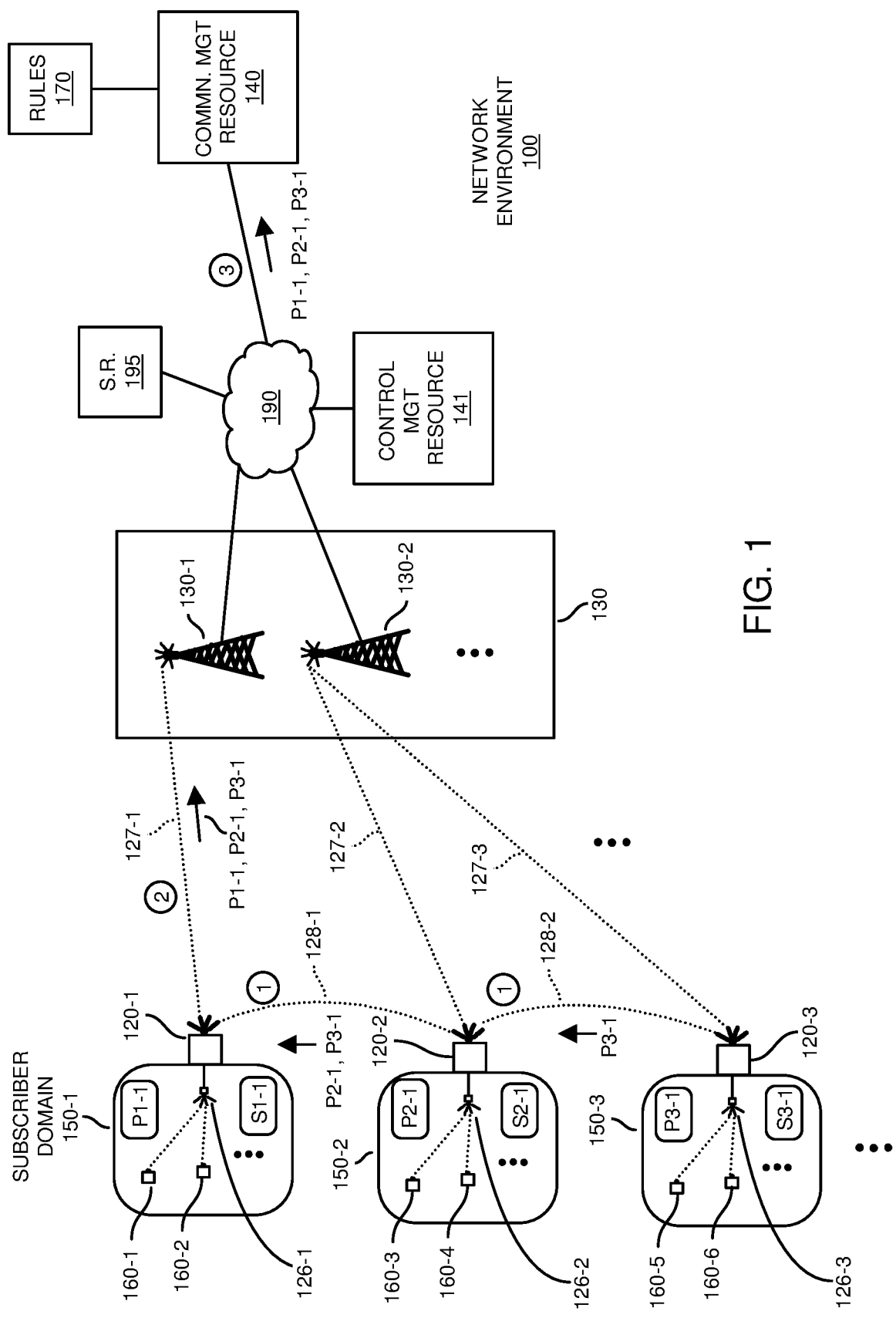
FIG. 1 is an example diagram illustrating collection and distribution of monitor data in a wireless network environment according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DESCRIPTION OF EMBODIMENTS

A wireless network environment includes multiple wireless stations (such as fixed wireless access points or customer premises equipment), a wireless network of one or more wireless base stations, and a communication management resource. A first wireless station establishes a first wireless link with the wireless network. A second wireless station establishes a second wireless link with the wireless network. Additionally, the first wireless station establishes second wireless connectivity providing a direct connection (wireless communication link) between the first wireless station and the second wireless station. Via the second wireless connectivity, the first wireless station receives data from the second wireless station. The first wireless station communicates the received data over the first wireless connectivity from the first wireless station to a communication management resource. The received data includes any suitable data such as performance metrics associated with the second wireless station and/or the second wireless link.

Now, with reference to the drawings, FIG. 1 is an example diagram illustrating collection and distribution of data in a wireless network environment according to embodiments herein.

In this example embodiment, the network environment 100 includes multiple subscriber domains 150 (such as subscriber domain 150-1, subscriber domain 150-2, subscriber domain 150-3, etc.) wireless network 130 (including wireless base station 130-1, wireless base station 130-2, etc.), communication management resource 140, and control management resource 141.

Each of the subscriber domains 150 includes a respective one or more mobile communication devices 160 (such as mobile communication device 160-1, mobile communication device 160-2, mobile communication device 160-3, mobile communication device 160-4, mobile communication device 160-5, mobile communication device 160-6, etc.).

Additionally, each of the subscriber domains 150 includes a wireless access point. For example, wireless access point 120-1 in subscriber domain 150-1 provides wireless connectivity (such as via any suitable wireless communication protocol including WiFi™, LTE or Long Term Evolution, etc.) to mobile communication devices 160-1, 160-2, etc. Wireless access point 120-2 in subscriber domain 150-2 provides wireless connectivity to mobile communication devices 160-3, 160-4, etc. Wireless access point 120-3 in subscriber domain 150-3 provides wireless connectivity to mobile communication devices 160-5, 160-6, etc.

As further shown, each of the wireless access points is coupled to a respective wireless station (such as customer premises equipment). For example, wireless access point 126-1 in subscriber domain 150-1 is coupled to wireless station 120-1 (such as first customer premises equipment); wireless access point 126-2 in subscriber domain 150-2 is coupled to wireless station 120-2 (such as second customer premises equipment); wireless access point 126-3 in subscriber domain 150-3 is coupled to wireless station 120-3 (such as third customer premises equipment), and so on.

In one nonlimiting example embodiment, each wireless station 120 is disposed at a respective fixed location. In such an instance, the wireless station 120-1 is a first fixed wireless station supporting first fixed wireless access to the user equipment in subscriber domain 150-1; the wireless station 120-2 is a second fixed wireless station supporting second fixed wireless access to the user equipment in subscriber domain 150-2; the wireless station 120-3 is a third fixed wireless station supporting third fixed wireless access to the user equipment in subscriber domain 150-3; and so on.

Each wireless station (such as customer premises equipment) provides connectivity (such as fixed wireless access connectivity) of the subscriber domain and corresponding equipment such as mobile communication devices 160 to wireless network 130.

For example, wireless station 120-1 is wirelessly connected to wireless base station 130-1 (and wireless network 130) via wireless communication link 127-1; wireless station 120-2 is wirelessly connected to wireless base station 130-2 (and wireless network 130) via wireless communication link 127-2; wireless station 120-3 is wirelessly connected to wireless base station 130-2 via wireless communication link 127-3 (and wireless network 130); and so on.

Yet further, each wireless station supports device-to-device connectivity with any number of one or more other wireless stations. For example, wireless station 120-1 (first customer premises equipment) establishes a supplemental wireless communication link 128-1 with wireless station 120-2 (second customer premises equipment); wireless station 120-2 (second customer premises equipment) establishes a supplemental wireless communication link 128-2 with wireless station 120-3 (third customer premises equipment); and so on.

As further shown, each of the wireless base stations 130 is further connected to the network 190 (such as including the Internet and any other suitable network), providing connectivity to one or more and corresponding server resources 195.

Assume that the mobile communication device 160-1 generates a request to retrieve respective content such as a webpage from server resource 195. To this end, in an upstream direction, mobile communication device 160-1 operated by a respective user transmits communications (such as a content request) over a respective wireless communication link in subscriber domain 150-1 to the wireless access point 126-1; the wireless access point 126-1 forwards the communications to wireless station 120-1 associated with the subscriber domain 150-1; the wireless station 120-1 transmits the communications over the wireless communication link 127-1 to the wireless base station 130-1; wireless base station 130-1 transmits the communications (such as a request for content) over network 190 to the server resource 195 (destination address identified by the request).

In a downstream direction, in response to receiving a request for content, the server resource 195 communicates the requested content (such as a web page or other suitable digital asset) over network 190 to the wireless base station 130-1; wireless base station 130-1 transmits the requested content to the wireless station 120-1; wireless station 120-1 transmits the requested content to wireless access point 126-1; wireless access point 126-1 wirelessly transmits the requested content to the mobile communication device 160-1.

In a similar manner, the mobile communication device 160-2 communicates data in upstream direction to the server resource 195; server resource 195 communicates data in a downstream direction to the mobile communication device 160-2.

In accordance with further example embodiments, the respective wireless stations or other suitable resources generate performance information associated with each of the subscriber domains and corresponding wireless stations and wireless communication links.

For example, wireless station 120-1 implements settings S1-1 (such as generated and distributed by the control management resource 141) to communicate over wireless communication link 127-1. In one embodiment, based on transmission and reception of wireless communications over wireless communication link 127-1, the wireless station 120-1 or other suitable monitor resource generates performance information P1-1 indicating a performance or the respective wireless communication link 127-1.

Wireless station 120-2 implements settings S2-1 (such as generated and distributed by the control management resource 141) to communicate over wireless communication link 127-2. In one embodiment, based on transmission and reception of wireless communications over wireless communication link 127-2, the wireless station 120-2 or other suitable monitor resource generates performance information P2-1 indicating a performance or the respective wireless communication link 127-2.

Wireless station 120-3 implements settings S2-1 (such as generated and distributed by the control management resource 141) to communicate over wireless communication link 127-3. In one embodiment, based on transmission and reception of wireless communications over wireless communication link 127-3, the wireless station 120-3 or other suitable monitor resource generates performance information P3-1 indicating a performance or the respective wireless communication link 127-1.

Thus, embodiments herein include multiple wireless stations 120 (such as fixed wireless access stations), a wireless network 130 of one or more wireless base stations 130-1, 130-2, etc., and a communication management resource 140. The first wireless station 120-1 and the wireless network 130 collectively establish a first wireless link 127-1 between the first wireless station 120-1 and the wireless base station 130-1. The second wireless station 120-2 and the wireless network 130 collectively establish a second wireless link 127-2 between the second wireless station 120-2 and the wireless base station 130-2. The third wireless station 120-3 and the wireless network 130 collectively establish a third wireless link 127-3 between the third wireless station 120-3 and the wireless base station 130-2.

Note further that the first wireless station 120-1 also establishes supplemental wireless connectivity 128-1 providing a direct connection (such as a device-to-device wireless connection as opposed to be connected to the wireless station 120-2 through a respective wireless base station) between the first wireless station 120-1 and the second wireless station 120-2. Via the second wireless connectivity (such as wireless communication link 128-1), the wireless station 120-1 receives data (such as data P2-1 associated with wireless communication link 127-2) from the second wireless station 120-2.

Note further that the second wireless station 120-2 also establishes supplemental wireless connectivity 128-2 providing a direct connection (such as a device-to-device wireless connection) between the second wireless station 120-2 and the third wireless station 120-3. Via the wireless connectivity provided by the wireless communication link 128-2, the wireless station 120-2 receives second data (such as data P3-1 associated with wireless communication link 127-3) from the third wireless station 120-3.

In one embodiment, the wireless station 120-3 communicates data P3-1 to the wireless station 120-2 over the wireless communication link 128-2. Wireless station 128-2 communicates the data P3-1 over wireless communication link 128-1 to the wireless station 120-1.

As previously discussed, the wireless station 120-1 generates data P1-1 associated with the wireless communication link 127-1.

Subsequent to receiving data P2-1 and P3-1, the wireless station 120-1 communicates a combination of the received data P1-1, P2-1, and P3-1 (such as wireless settings, performance metrics, etc.) over the wireless communication link 127-1 to the wireless base station 130-1. Wireless base station 130-1 communicates the received information P1-1, P2-1, and P3-1 over the wireless communication link 127-1. Wireless base station 130-1 communicates the received information P1-1, P2-1, and P3-1 to the communication management resource 140.

In such an instance, via data P1-1, P2-1, P3-1, etc., the wireless station 120-1 apprises the communication management resource 140 of attributes (such as wireless settings, performance metrics, etc.) associated with the wireless communication link 127-1, wireless communication link 127-2, and wireless communication link 127-3.

Figure 2:
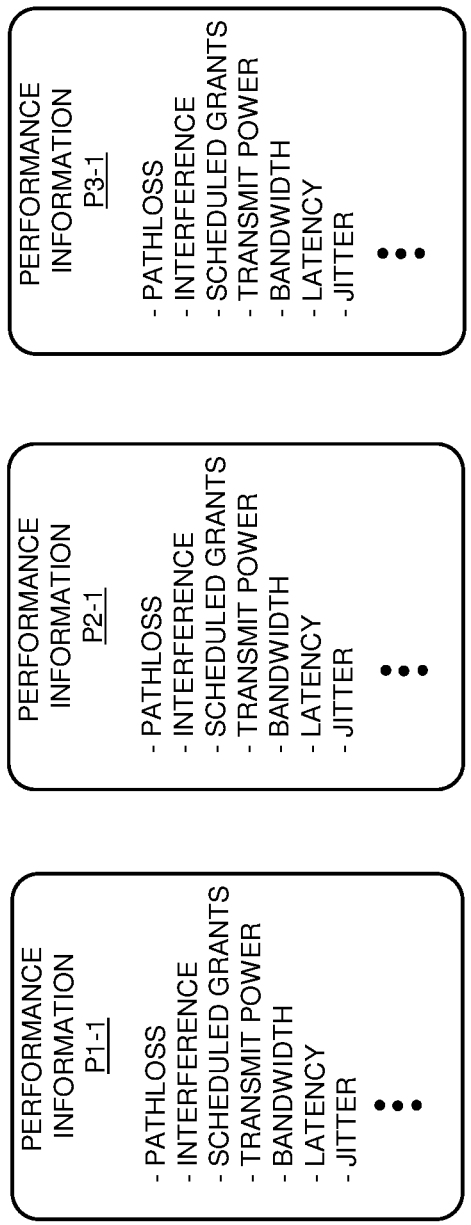
FIG. 2 is an example diagram illustrating collected performance information according to embodiments herein.

FIG. 2 is an example diagram illustrating collected performance information according to embodiments herein.

In this example embodiment, each of the sets of data P1-1, P2-1, P3-1, etc., includes performance metrics associated with a respective wireless link.

For example, in one embodiment, data P2-1 (such as generated by or associated with wireless station 120-1 and/or subscriber domain 150-1) is performance information associated with wireless communication link 127-1. The performance information includes metrics such as: i) pathloss of wireless communication link 127-1 between wireless station 120-1 and the wireless base station 130-1, ii) level of channel interference associated with communications between the wireless station 120-1 and wireless base station 130-1 over wireless communication link 127-1 as detected by the wireless station 120-1 or other suitable resource, iii) scheduled grant times associated with communications to being transmitted or received over the wireless communication link 127-1, iv) wireless transmit power level setting information of the wireless station 120-1 transmitting respective wireless communications, v) available or used bandwidth associated with the wireless communication link 127-2, vi) wireless receive power level of communications received over the wireless communication link 127-1 as measured by the wireless station 120-1, vii) latency associated with conveyance of communications over wireless communication link 127-2, viii) jitter attributes associated with wireless communication link 127-1, ix) wireless connectivity information associated with communications between the wireless access point 126-1 and respective mobile communication device 160-1, 160-2, etc., and so on.

In accordance with further example embodiments, data P2-1 (such as generated by or associated with wireless station 120-2) is performance information associated with wireless communication link 127-2 including performance metrics such as: i) pathloss of wireless communication link 127-2 between wireless station 120-2 and the wireless base station 130-2, ii) level of channel interference associated with communications between the wireless station 120-2 and wireless base station 130-2 over wireless communication link 127-2 as detected by the wireless station 120-2 or other suitable resource, iii) scheduled grant times associated with communications to be transmitted or received over the wireless communication link 127-2 from wireless station 120-2, iv) wireless transmit power level settings of the wireless station 120-2, v) bandwidth associated with the wireless communication link 127-2, vi) wireless receive power level of communications received over the wireless communication link 127-2 as measured by the wireless station 120-2, vii) latency associated with conveyance of communications over wireless communication link 127-2, viii) jitter attributes associated with wireless communication link 127-2, ix) wireless connectivity information associated with communications between the wireless access point 126-2 and respective mobile communication device 160-3, 160-4, etc., and so on.

In accordance with further example embodiments, data P3-1 (such as generated by or associated with wireless station 120-3) is performance information associated with wireless communication link 127-3 including performance metrics such as: i) pathloss of wireless communication link 127-3 between wireless station 120-3 and the wireless base station 130-2, ii) level of channel interference associated with communications between the wireless station 120-3 and wireless base station 130-2 over wireless communication link 127-3 as detected by the wireless station 120-3 or other suitable resource, iii) scheduled grant times associated with communications to be transmitted or received over the wireless communication link 127-3 from wireless station 120-3, iv) wireless transmit power level setting of the wireless station 120-3, v) available or used bandwidth associated with the wireless communication link 127-3, vi) wireless receive power level of communications received over the wireless communication link 127-3 as measured by the wireless station 120-3, vii) latency associated with conveyance of communications over wireless communication link 127-3, viii) jitter attributes associated with wireless communication link 127-3, ix) wireless connectivity information associated with communications between the wireless access point 126-3 and respective mobile communication device 160-5, 160-6, etc., and so on.

Additionally, or alternatively, note that each of the sets of data P1-1, P2-1, P3-1, etc., can be configured to include any suitable information associated with a corresponding subscriber domain, wireless access point, etc. For example, data P1-1 can include information about subscriber domain 150-1, wireless access point 126-1, etc.; data P2-1 can include information about subscriber domain 150-2, wireless access point 126-2, etc.; data P3-1 can include information about subscriber domain 150-3, wireless access point 126-3, etc., and so on.

Figure 3:
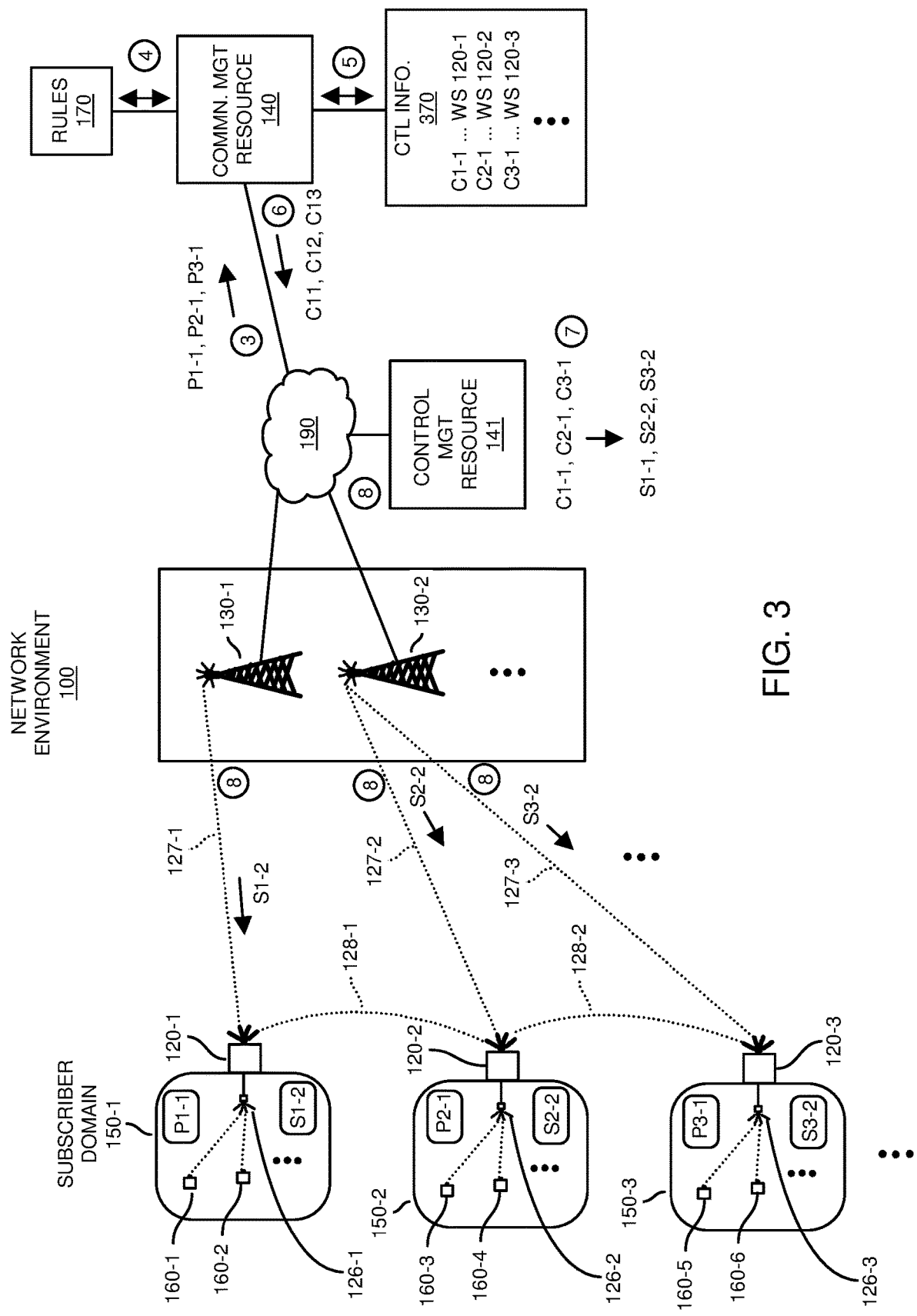
FIG. 3 is an example diagram illustrating generation of control information and distribution of wireless station settings according to embodiments herein.

FIG. 3 is an example diagram illustrating generation of control information and distribution of wireless station settings according to embodiments herein.

In accordance with yet further example embodiments, the communication management resource 140 receives the performance information P1-1, P2-1, P3-1, etc.

In one embodiment, the communication management resource 140 analyzes the performance information P1-1, P2-1, P3-1 to determine if the performance associated with each of the wireless communication link 127 is sufficient. If desired, based on performance information, the communication management resource 140 applies control rules 170 to control one or more attributes of the respective subscriber domain or corresponding wireless communication link 127.

Based on the analysis, and application of the rules 170, the communication management resource 140 generates control information 370 associated with each of the wireless stations 120-1, 120-2, 120-3, etc., or other resources in a respective subscriber domain.

Communication management resource 140 communicates the control information 370 to the control management resource 141. Via the control information 370, the control management resource generates settings to be applied to each of the wireless stations 120.

More specifically, as its name suggests, the control management resource 141 controls different attributes of wireless connectivity 127 between the wireless stations 120 and the wireless network 130. For example, as a response to the control information 370 generated by the communication management resource 140, the control management resource 141 controls wireless connectivity 127 (such as establishing connectivity, scheduling communications, power transmit levels, etc.) and corresponding conveyance of upstream and downstream wireless communications.

In one embodiment, the control management resource 141 generates corresponding settings for each of the wireless stations 120. For example, via control information C1-1, control management resource 141 generates settings S1-1 that controls different parameters associated with wireless station 120-1; via control information C2-1, control management resource 141 generates settings S2-2 that controls different parameters associated with wireless station 120-2; via control information C3-1, control management resource 141 generates settings S3-2 that controls different parameters associated with wireless station 120-3; and so on.

In one embodiment, control management resource 141 generates the respective settings to adjust the attributes of respective wireless communication links 127 such that the wireless communication links 127 provide sufficient performance above a respective threshold value.

Thus, in one embodiment, data P1-1 received by the communication management resource 140 from the first wireless station 120-1 indicates attributes of the first wireless link 127-1. Based on processing of the first data P1-1 associated with the first wireless link, the control management resource 141 generates a notification (such as including settings information S1-1) from the communication management resource 140 to the first wireless station 120-1; the notification S1-1 indicates to adjust settings and/or attributes associated with the first wireless communication link 127-1.

In accordance with still further embodiments, based on processing of the connectivity/performance data (such as P1-1, P2-1, P3-1, etc.), via generation and distribution of settings S1-1, S2-2, S3-2, etc., the communication management resource 140 and/or control management resource 141 schedules first communications between the wireless station 120-1 and the wireless network wireless network 130; the communication management resource schedules second communications between the wireless station 120-2 and the wireless network 130, and so on.

Figure 4:
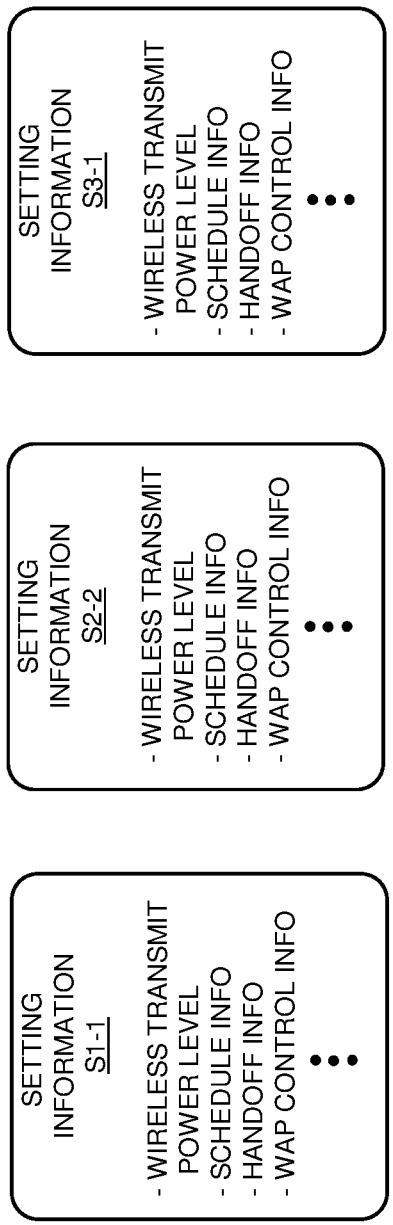
FIG. 4 is an example diagram illustrating updated setting information according to embodiments herein.

FIG. 4 is an example diagram illustrating updated setting information according to embodiments herein.

In this example embodiment, the control management resource 141 generates settings information to apply to apply to the subscriber domains based on the control information C1-1, C2-1, and C3-1 received from the communication management resource 140. Additionally, or alternatively, note that the control management resource 141 and the communication management resource 140 can be combined into a single entity that receives and analyzes performance information P1-1, P2-1, P3-1, etc., as well as generates and distributes control information settings S1-1, S2-2, S3-2, etc.

As shown, setting information S1-1 indicates settings such as: i) wireless transmit power settings and/or modulation settings associated with future communications to be transmitted from the wireless station 120-1 over wireless communication link 127-1, ii) schedule information in which the wireless station 120-1 is to receive and transmit wireless data over wireless communication link 127-1, iii) handoff control information indicating whether the wireless station 120-1 must handoff the respective wireless communication link 127-1 to another wireless base station such as wireless base station 130-2, iv) wireless access point control information to be applied to wireless access point 126-1 in subscriber domain 150-1, etc.

Setting information S2-2 (replacement to prior applied settings S2-1) indicates settings such as: i) wireless transmit power settings and/or modulation settings associated with future communications to be transmitted from the wireless station 120-2 over wireless communication link 127-2, ii) schedule information in which the wireless station 120-2 is to receive and transmit wireless data over wireless communication link 127-2, iii) handoff control information indicating whether the wireless station 120-2 must handoff the respective wireless communication link 127-2 to another wireless base station such as wireless base station 130-1, iv) wireless access point control information to be applied to wireless access point 126-2 in subscriber domain 150-2, etc.

Setting information S3-2 (replacement to prior applied settings S3-1) indicates settings such as: i) wireless transmit power settings and/or modulation settings associated with future communications to be transmitted from the wireless station 120-3 over wireless communication link 127-3, ii) schedule information in which the wireless station 120-3 is to receive and transmit wireless data over wireless communication link 127-3, iii) handoff control information indicating whether the wireless station 120-3 must handoff the respective wireless communication link 127-3 to another wireless base station such as wireless base station 130-1, iv) wireless access point control information to be applied to wireless access point 126-3 in subscriber domain 150-3, etc.

Figure 5:
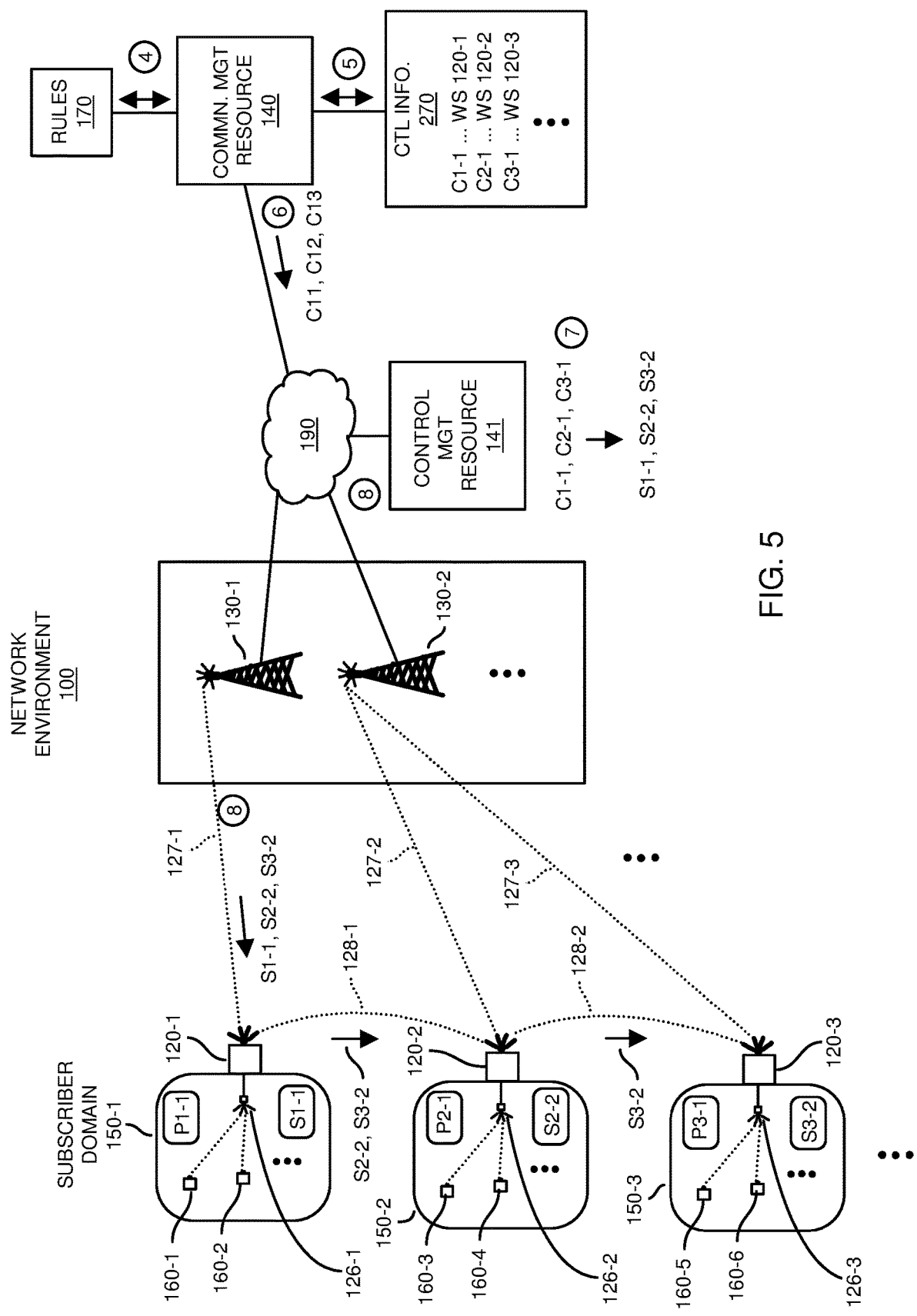
FIG. 5 is an example diagram illustrating generation of control information and an alternative distribution of wireless station settings according to embodiments herein.

FIG. 5 is an example diagram illustrating generation of control information and distribution of wireless station settings according to embodiments herein.

Note that as an alternative to communicating settings information over a respective wireless communication link 127 to a corresponding wireless station 120, embodiments herein include communicating the settings information or other suitable information to the respective wireless stations via communication of the settings information S1-2, S2-2, and S3-2 from wireless base station 130-1 over wireless communication link 127-1 to the wireless station 120-1.

In response to receiving the settings information S1-2, S2-2, and S3-2, the wireless station 120-1 applies new settings information S1-2 to the appropriate one or more entities in subscriber domain 150-1 such as wireless station 120-1, wireless access point 126-1, etc. Wireless station 120-1 communicates settings information S2-2 and S3-2 over wireless communication link 128-1 to the wireless station 120-2.

In response to receiving the settings information S2-2 and S3-2, the wireless station 120-2 applies settings information S2-2 to the appropriate one or more entities in subscriber domain 150-2 such as wireless station 120-2, wireless access point 126-2, etc. Wireless station 120-2 communicates settings information S3-2 over wireless communication link 128-2 to the wireless station 120-3.

In response to receiving the settings information S3-2, the wireless station 120-2 applies settings information S3-2 to the appropriate one or more entities in subscriber domain 150-3 such as wireless station 120-3, wireless access point 126-3, etc.

Figure 6:
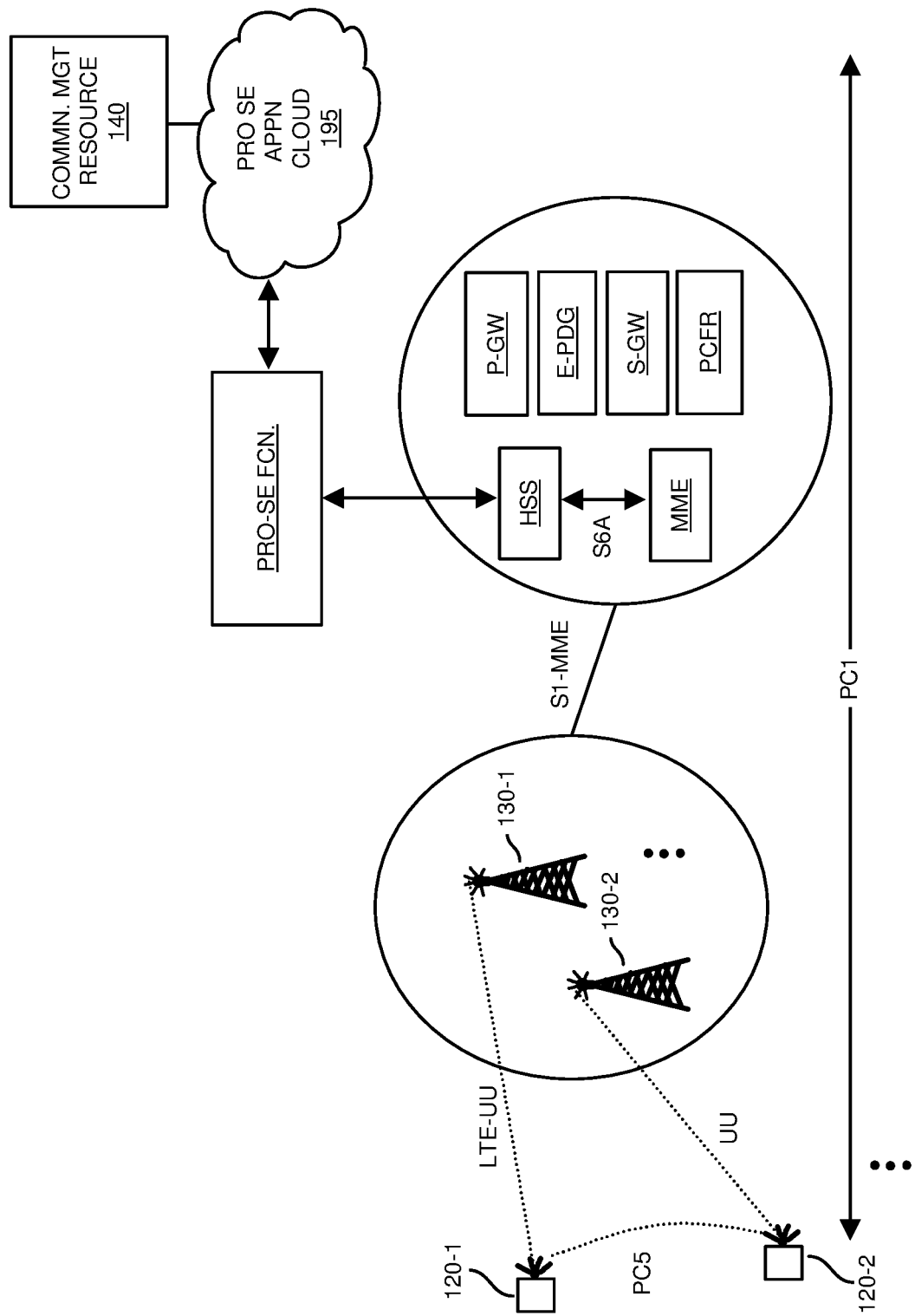
FIG. 6 is an example diagram illustrating a wireless network according to embodiments herein.

FIG. 6 is an example diagram illustrating a wireless network according to embodiments herein.

This example embodiment illustrates coordination of fixed wireless customer premises equipment to provide improved network performance.

As previously discussed, fixed wireless access (FWA) is a cost effective option to provide broadband wireless services in rural areas where it is difficult to connect home environments via a physical cable.

In general, customer premises equipment (CPE) processes mobile broadband data and routes the data to the router for customer access through ethernet or WiFi™. Traditionally, a respective CPE is fixed once installed. However, over time, due to changes in the RF Environment and conditions, physical antenna optimization may be required to select the best base station or azimuth. Thus, quality of communications can degrade.

Embodiments herein include a proposed CPE solution to improve network performance by coordinating operation over so-called D2D connectivity between customer premises equipment and providing updated settings information on an as-needed basis. Unlike in mobility, CPE antennas (associated with wireless stations are high gain and fixed. CPE antennas with high transmit power and high gain are much like mini-macro enodeBs and therefore would cause more interference compared to hand-held low power counterparts.

CPEs are unaware of each other and depend on corresponding enodeBs (such as wireless base station 130 and control management resource 141) for resource management and scheduling. Knowing each other's location and sharing of performance information (P1, P2, P3, etc.) such as pathloss, interference, scheduled grants, transmit power, KPIs such as throughput, latency and jitter, etc., as described herein can be implemented to increase optimization of enodeB selection and avoiding of interference/collisions with other CPEs in real time.

In one embodiment, ProSe provides the following parameters to the CPEs to enable connectivity among themselves and assign unique IDs: Security parameters, Group IDs multicast addresses, Group ID multicast addresses and radio resource parameters. As further discussed herein, one of the CPEs (such as wireless station 120-1) acts as a master device and sends collected information over an LTE-interface such as wireless communication link 127-1.

The relay/master CPE (such as wireless station 120-1) shares and collects information from all CPEs, aggregates and sends such collected data via PC1 interface for processing in the cloud or, more specifically, communication management resource 140. The communication management resource 140 sends the collected information or control information to the MME (such as control management resource 141) which would select the appropriate settings for each subscriber domain.

In one embodiment, the MME is also in control of scheduling. Based on performance parameters such as pathloss and bit error rate and RF conditions, the MME schedules uplink data communications to reduce interference. In accordance with further embodiments, the MME dynamically instructs enodeBs and CPEs to change power levels and adjust antenna patterns and beamforming directions. Additionally, as described herein, the MME can be configured to produce settings information for transmission over one or more wireless communication link 127 to the appropriate wireless station. Alternatively, the MME can be configured to communicate setting information to a master wireless station (such as wireless station 120-1) that further communicates the settings information to the appropriate wireless stations (such as wireless station 120-2, wireless station 120-3, etc.) such as over wireless communication link 128-1, 128-2, etc., or via distribution over wireless communication link 128-1, 128-2, etc.

Figure 7:
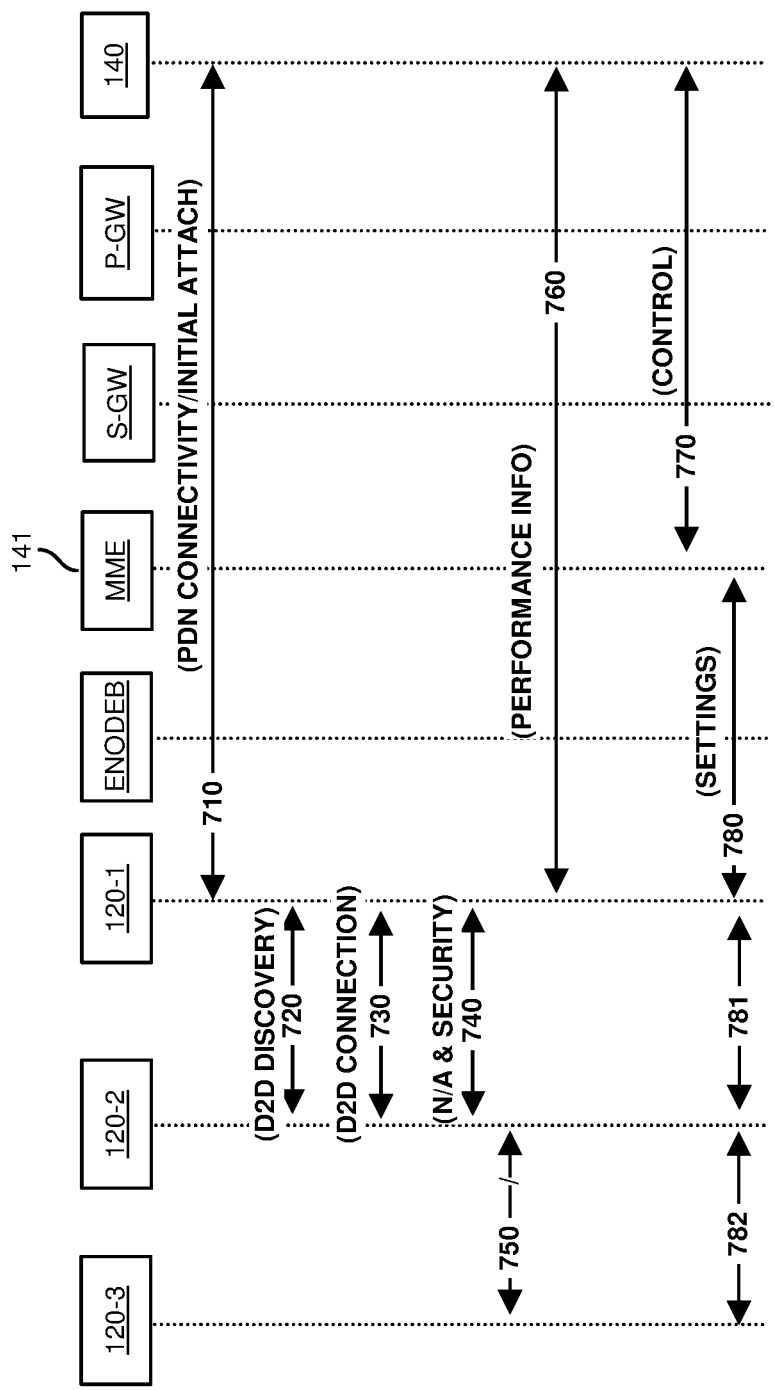
FIG. 7 is an example diagram illustrating communications according to embodiments herein.

FIG. 7 is an example diagram illustrating communications according to embodiments herein.

In this example embodiment, the wireless station 120-1 establishes PDN connectivity via communications 710.

Via communications 720, including device discovery, the wireless station 120-1 learns of the presence of wireless station 120-2 in the network environment 100. In one embodiment, each of the wireless station 120-2 transmits wireless signals indicating its presence.

Via communications 730, the wireless station 120-1 and wireless station 120-2 establish device-to-device wireless connectivity 128-1 supporting device-to-device communications between the wireless station 120-2 and wireless station 120-1.

Via communications 740, the wireless station 120-1 and wireless station 120-2 exchange appropriate information to establish the wireless connectivity 128-1 as a secured wireless communication link.

Via communications 750, the wireless station 120-2 (or wireless station 120-1) discovers wireless station 120-3, establishes wireless connectivity 128-2 supporting device-to-device communications between the wireless station 120-3 and wireless station 120-2, and exchanges appropriate information to establish the wireless connectivity 128-2 as a secured wireless communication link in a similar manner as previously discussed for wireless communication link 128-1.

Further, as previously discussed, the wireless station 120-1 receives performance information P2, P3, etc., from the wireless stations 120-2, 120-3, etc. Via communications 760, the wireless station 120-1 communicates the received performance information P2, P3, etc., as well as performance information P1 (associated with wireless station 120-1) to the communication management resource 140.

Via communications 770, the communication management resource 140 communicates generated control information to the control management resource 141. Control management resource 141 uses the control information to control settings of the wireless stations and corresponding wireless connectivity 127. In one embodiment, the control management resource 141 communicates respective settings information to each of the wireless stations over a respective wireless communication link 127.

Alternatively, via communications 781 and 782, the wireless station 120-1 potentially distributes received settings to each of the wireless station via wireless communication link 128.

Figure 8:
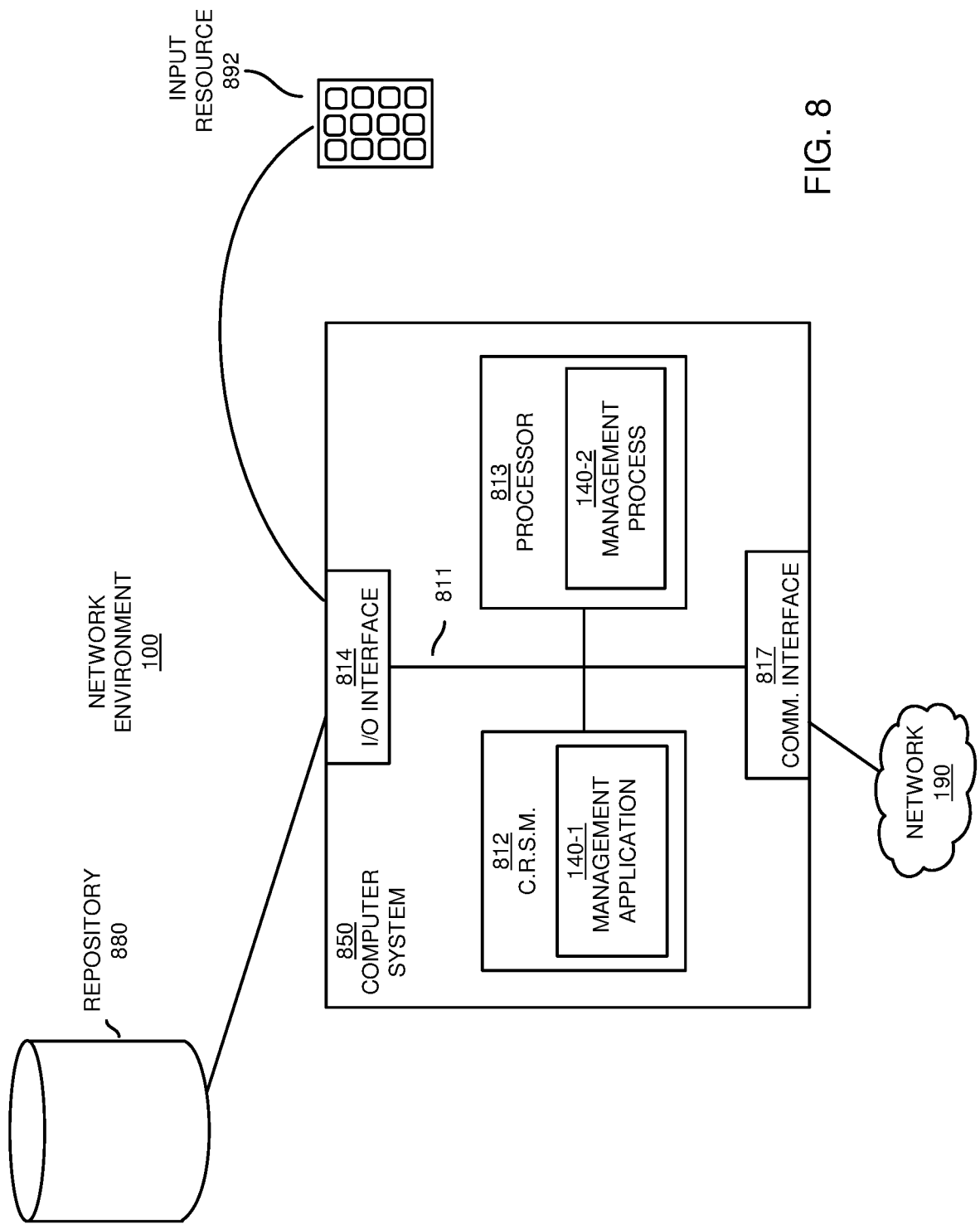
FIG. 8 is an example diagram illustrating example computer hardware and software operable to execute operations according to embodiments herein.

FIG. 8 is an example block diagram of a computer system for implementing any of the operations as previously discussed according to embodiments herein.

Note that any of the resources (such as mobile communication devices, user equipment, wireless stations, wireless base stations, communication management resource, control management resource, etc.) as discussed herein can be configured to include computer processor hardware and/or corresponding executable instructions to carry out the different operations as discussed herein.

For example, as shown, computer system 850 of the present example includes interconnect 811 coupling computer readable storage media 812 such as a non-transitory type of media (which can be any suitable type of hardware storage medium in which digital information can be stored and or retrieved), a processor 813 (computer processor hardware), I/O interface 814, and a communications interface 817.

I/O interface(s) 814 supports connectivity to repository 880 and input resource 892.

Computer readable storage medium 812 can be any hardware storage device such as memory, optical storage, hard drive, floppy disk, etc. In one embodiment, the computer readable storage medium 812 stores instructions and/or data.

As shown, computer readable storage media 812 can be encoded with management application 140-1 (e.g., including instructions) in a respective wireless station to carry out any of the operations as discussed herein.

During operation of one embodiment, processor 813 accesses computer readable storage media 812 via the use of interconnect 811 in order to launch, run, execute, interpret or otherwise perform the instructions in management application 140-1 stored on computer readable storage medium 812. Execution of the management application 140-1 produces management process 140-2 to carry out any of the operations and/or processes as discussed herein.

Those skilled in the art will understand that the computer system 850 can include other processes and/or software and hardware components, such as an operating system that controls allocation and use of hardware resources to execute the management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 850 may reside at any location or can be included in any suitable resource in any network environment to implement functionality as discussed herein.

Functionality supported by the different resources will now be discussed via flowcharts in FIG. 9. Note that the steps in the flowcharts below can be executed in any suitable order.

Figure 9:
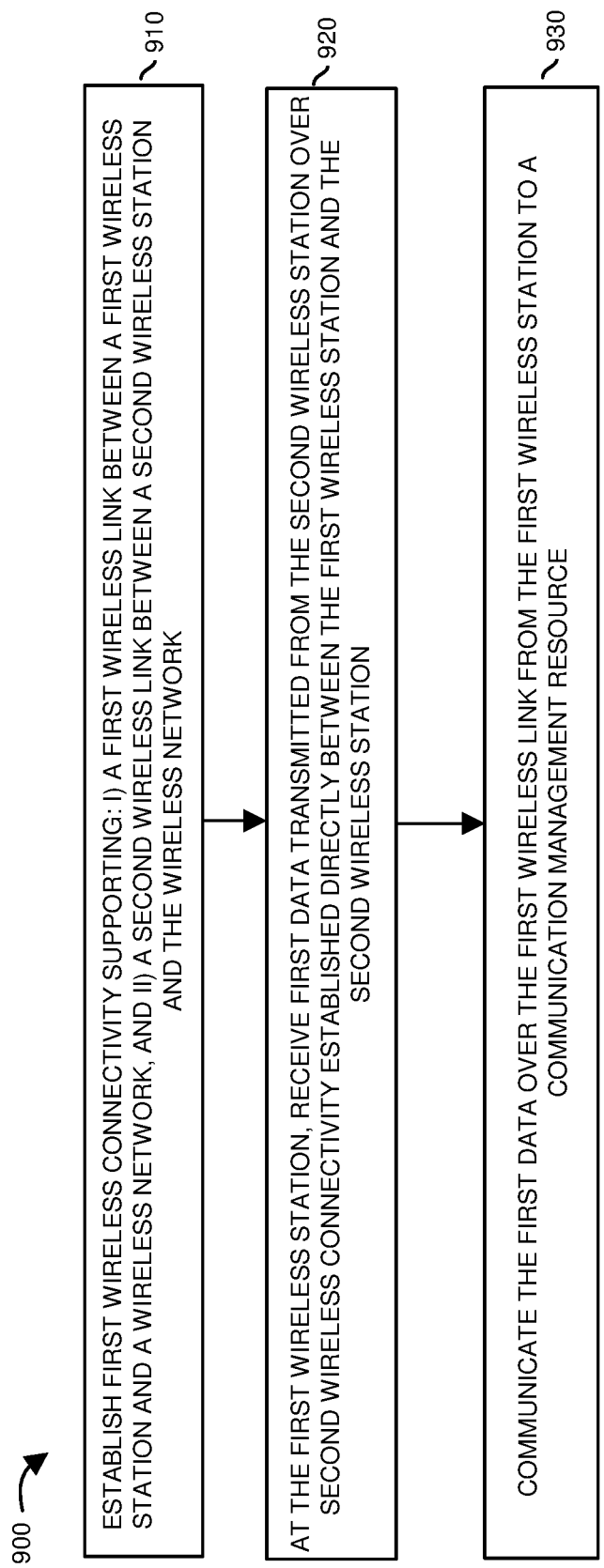
FIG. 9 is an example diagram illustrating a method according to embodiments herein.

FIG. 9 is a flowchart 900 illustrating an example method according to embodiments herein. Note that there will be some overlap with respect to concepts as discussed above.

In processing operation 910, the wireless station 120-1 (such as first customer premises equipment) establishes first wireless connectivity 127-1 supporting: i) a first wireless link 127-1 between the wireless station 120-1 and the wireless network 130 (such as to wireless base station 130-1), and ii) a second wireless link 128-1 between the wireless station 120-1 and a second wireless station wireless station 120-2 (such as second customer premises equipment).

In processing operation 920, the wireless station 120-1 receives first data (such as data P2-1) transmitted from the wireless station 120-2 over wireless connectivity 128-1.

In one embodiment, the second wireless connectivity is a wireless communication link 128-1 (such as a device-to-device wireless connection established directly between the wireless station 120-1 and wireless station 120-2.

In processing operation 930, the wireless station 120-1 communicates the first data (such as data P2-1) and, if desired, data P1-1 over the wireless link 127-1 from the wireless station 120-1 over network 190 to the remotely located communication management resource 141.

Note again that techniques herein are well suited to facilitate collection of information from one or more wireless station and distribution of the information over a network to a communication management resource. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:

establishing first wireless connectivity supporting: i) a first wireless link between a first wireless station and a wireless network, the first wireless station providing a first subscriber domain of first communication devices access through the wireless network via the first wireless link; and ii) a second wireless link between a second wireless station and the wireless network, the second wireless station providing a second subscriber domain of second communication devices access through the wireless network via the second wireless link;

at the first wireless station, receiving first data transmitted from the second wireless station over second wireless connectivity established directly between the second wireless station and the first wireless station; and communicating the first data over the first wireless link from the first wireless station to a management resource;

wherein the first wireless connectivity supports a third wireless link between a third wireless station and the wireless network, the method further comprising:

at the first wireless station, receiving second data transmitted from the third wireless station over third wireless connectivity established between the third wireless station through the second wireless station to the first wireless station; and from the first wireless station, communicating the second data over the first wireless link to the management resource.

2. A method comprising;

establishing first wireless connectivity supporting: i) a first wireless link between a first wireless station and a wireless network, the first wireless station providing a first subscriber domain of first communication devices access through the wireless network via the first wireless link; and ii) a second wireless link between a second wireless station and the wireless network, the second wireless station providing a second subscriber domain of second communication devices access through the wireless network via the second wireless link;

at the first wireless station, receiving first data transmitted from the second wireless station over second wireless connectivity established directly between the second wireless station and the first wireless station;

communicating the first data over the first wireless link from the first wireless station to a management resource; and wherein the first data includes performance metrics associated with conveying communications over the second wireless link between the second wireless station and the wireless network.

3. The method as in claim 1, wherein the first data indicates performance attributes of the second wireless link, the method further comprising:

based on processing of the first data, generating a notification from the management resource to the first wireless station, the notification indicating to adjust settings associated with the second wireless link.

4. The method as in claim 3 further comprising:
communicating the notification to a base station management resource, the base station management resource controlling attributes of the second wireless link based on the notification.

5. The method as in claim 1, wherein the first data includes performance metrics associated with the second wireless link between the second wireless station and the wireless network; and
wherein the second data includes performance metrics associated with the third wireless link between the third wireless station and the wireless network.

6. The method as in claim 5 further comprising:
based on processing of the first data and the second data: i) scheduling first communications between the second wireless station and the wireless network, and ii) scheduling second communications between the third wireless station and the wireless network.

7. The method as in claim 1, wherein the first data is connectivity data collected via monitoring of the second wireless link between the second wireless station and the wireless network.

8. The method as in claim 1 further comprising:
controlling transmission of communications over the second wireless communication link between the second wireless station and the wireless network based on the first data.

9. The method as in claim 1, wherein the first wireless station is coupled in the first subscriber domain to a first wireless access point in wireless communication with the first communication devices;
wherein the second wireless station is coupled in the second subscriber domain to a second wireless access point in wireless communication with the second communication devices; and
wherein the first data includes connectivity information associated with communications conveyed between the second wireless access point and the second mobile communication devices.

10. The method as in claim 9 further comprising:
at the first wireless station, producing second data, the second data including connectivity information associated with communications conveyed between the first wireless access point and the first mobile communication devices; and
communicating the second data over the first wireless link from the first wireless station to the management resource.

11. The method as in claim 2 further comprising:
at the first wireless station, collecting second data, the second data being associated with the first wireless link between the first wireless station and the wireless network, the second data being performance metrics associated with the first wireless link; and
from the first wireless station, communicating the second data over the first wireless link to the management resource.

12. The method as in claim 1, wherein the first wireless link is a first fixed wireless access link established between the first wireless station and a first wireless base station in the wireless network; and
wherein the second wireless link is a second fixed wireless access link established between the second wireless station and a second wireless base station in the wireless network.

13. A system comprising:
a first wireless station in communication with a wireless network over a first wireless link, the first wireless station providing a first subscriber domain of first communication devices access to the wireless network via the first wireless link;
a second wireless station in communication with the wireless network over a second wireless link, the second wireless station providing a second subscriber domain of second communication devices access to the wireless network via the second wireless link, the first wireless link and the second wireless link being first wireless connectivity;
the first wireless station operative to: i) receive first data transmitted from the second wireless station over second wireless connectivity established directly between the first wireless station and the second wireless station, and ii) communicate the first data over the first wireless link from the first wireless station to a management resource;
wherein the first wireless connectivity further supports a third wireless link between a third wireless station and the wireless network;
wherein the first wireless station is further operative to:
receive second data transmitted from the third wireless station over third wireless connectivity established directly between the first wireless station and the third wireless station; and
communicate the second data over the second wireless link to the management resource.

14. The system as in claim 13, wherein the first data includes performance metrics associated with conveying communications over the second wireless link between the second wireless station and the wireless network.

15. The system as in claim 14, wherein the first wireless station is further operative to:
collect second data, the second data being associated with the first wireless link between the first wireless station and the wireless network, the second data being performance metrics associated with the first wireless link; and
communicate the first data over the first wireless link to the management resource.

16. The system as in claim 13, wherein the first wireless link is a first fixed wireless access link established between the first wireless station and a first wireless base station in the wireless network; and
wherein the second wireless link is a second fixed wireless access link established between the second wireless station and a second wireless base station in the wireless network.

17. The system as in claim 13, wherein the first data indicates attributes of the second wireless link; and
wherein the management resource is operative to, based on processing of the first data, generate a notification indicating to adjust settings associated with the second wireless link.

18. The system as in claim 17, wherein the management resource is further operative to:
communicate the notification to a base station management resource, the base station management resource controlling attributes of the second wireless link based on the notification.

19. The system as in claim 13, wherein the first data includes performance metrics associated with first communications over the second wireless link between the second wireless station and the wireless network; and wherein the second data includes performance metrics associated with second communications conveyed over the third wireless link between the third wireless station and the wireless network.

20. The system as in claim 19, wherein the management resource is further operative to:
based on processing of the first data and the second data: i) schedule first communications between the first wireless station and the wireless network, and ii) schedule second communications between the third wireless station and the wireless network.

21. The system as in claim 19, wherein the management resource is further operative to:
based on processing of the first data and the second data, schedule: i) first communications between the second wireless station and the wireless network, and ii) second communications between the third wireless station and the wireless network.

22. The system as in claim 13, wherein the first data is connectivity data collected via monitoring of the second wireless link between the first wireless station and the wireless network.

23. Computer-readable storage hardware having instructions stored thereon, the instructions, when carried out by computer processor hardware, cause the computer processor hardware to:
establish first wireless connectivity supporting: i) a first wireless link between a first wireless station and a wireless network, the first wireless station providing a first subscriber domain of multiple communication devices access to the wireless network via the first wireless link; and ii) a second wireless link between a second wireless station and the wireless network, the second wireless station providing a second subscriber domain of multiple communication devices access to the wireless network via the second wireless link;
at the first wireless station, receive first data transmitted from the second wireless station over second wireless connectivity established directly between the second wireless station and the first wireless station; and
communicate the first data over the first wireless link from the first wireless station to a management resource;
wherein the first wireless connectivity supports a third wireless link between a third wireless station and the wireless network, the computer processor hardware further operative to:
at the first wireless station, receive second data transmitted from the third wireless station over third wireless connectivity established between the third wireless station through the second wireless station to the first wireless stations; and
from the first wireless station, communicate the second data over the first wireless link to the management resource.

24. A method comprising:
establishing first wireless connectivity supporting: i) a first wireless link between a first wireless station and a wireless network, the first wireless station providing a first subscriber domain of first communication devices access throw h the wireless network via the first wireless link; and ii) a second wireless link between a second wireless station and the wireless network, the second wireless station providing a second subscriber domain of second communication devices access through the wireless network via the second wireless link;
at the first wireless station, receiving first data transmitted from the second wireless station over second wireless connectivity established directly between the second wireless station and the first wireless station; and
communicating the first data over the first wireless link from the first wireless station to a management resource;
wherein the first data includes performance metrics associated with conveying communications over the second wireless link between the second wireless station and the wireless network;
wherein the management resource is operative to generate first control information and second control information based on the performance metrics associated with the second wireless link, the method further comprising:
receiving the first control information and the second control information from the management resource;
implementing the first control information at the first wireless station to control communications over the first wireless communication link; and
communicating the second control information from the first wireless station over the second wireless connectivity to the second wireless station.

25. A method comprising:
establishing first wireless connectivity supporting: i) a first wireless link between a first wireless station and a wireless network, the first wireless station providing a first subscriber domain of first communication devices access through the wireless network via the first wireless link; and ii) a second wireless link between a second wireless station and the wireless network, the second wireless station providing a second subscriber domain of second communication devices access through the wireless network via the second wireless link;
at the first wireless station, receiving first data transmitted from the second wireless station over second wireless connectivity established directly between the second wireless station and the first wireless station; and
communicating the first data over the first wireless link from the first wireless station to a management resource;
the method further comprising:
receiving first control information and second control information from the management resource;
executing the first control information at the first wireless station to control communications from the first wireless station over the first wireless link; and
communicating the second control information from the first wireless station over the second wireless connectivity to the second wireless station.

26. The method as in claim 25, wherein the first data includes performance metrics associated with the second wireless link conveying communications between the second wireless station and the wireless network; and
wherein the management resource is operative to generate the second control information based on the performance metrics associated with the second wireless link.

27. The method as in claim 26, wherein the first wireless link is a first fixed wireless access link established between the first wireless station and a first wireless base station in the wireless network; and
wherein the second wireless link is a second fixed wireless access link established between the second wireless station and a second wireless base station in the wireless network.

28. The method as in claim 26, wherein the first wireless station is operative to discover presence of the second wireless station via communications transmitted from the second wireless station; and wherein the first wireless station and the second wireless station exchange information to establish the second wireless connectivity as a secured wireless communication link.

29. A method comprising:

establishing first wireless connectivity supporting: i) a first wireless link between a first wireless station and a wireless network, the first wireless station providing a first subscriber domain of first communication devices access through the wireless network via the first wireless link; and ii) a second wireless link between a second wireless station and the wireless network, the second wireless station providing a second subscriber domain of second communication devices access through the wireless network via the second wireless link;

at the first wireless station, receiving first data transmitted from the second wireless station over second wireless connectivity established directly between the second wireless station and the first wireless station; and communicating the first data over the first wireless link from the first wireless station to a management resource;

wherein the first wireless connectivity supports a third wireless link between a third wireless station and the wireless network;

the method further comprising: at the first wireless station, receiving second data transmitted from the third wireless station over third wireless connectivity established between the third wireless station through the second wireless station to the first wireless station; and from the first wireless station, communicating the second data over the first wireless link to the management resource.

30. The method as in claim 29, wherein the first data includes performance metrics associated with the second wireless link between the second wireless station and the wireless network;

wherein the second data includes performance metrics associated with the third wireless link between the third wireless station and the wireless network; and the method further comprising: based on processing of the first data and the second data: i) scheduling first communications between the second wireless station and the wireless network, and ii) scheduling second communications between the third wireless station and the wireless network.

31. A method comprising:

establishing first wireless connectivity supporting: i) a first wireless link between a first wireless station and a wireless network, the first wireless station providing a first subscriber domain of first communication devices access through the wireless network via the first wireless link; and ii) a second wireless link between a second wireless station and the wireless network, the second wireless station providing a second subscriber domain of second communication devices access through the wireless network via the second wireless link;

at the first wireless station, receiving first data transmitted from the second wireless station over second wireless connectivity established directly between the second wireless station and the first wireless station; and communicating the first data over the first wireless link from the first wireless station to a management resource;

wherein the first wireless station is coupled in the first subscriber domain to a first wireless access point in wireless communication with the first communication devices;

wherein the second wireless station is coupled in the second subscriber domain to a second wireless access point in wireless communication with the second communication devices; and wherein the first data includes connectivity information associated with communications conveyed between the second wireless access point and the second mobile communication devices;

at the first wireless station, producing second data, the second data including connectivity information associated with communications conveyed between the first wireless access point and the first mobile communication devices;

communicating the second data over the first wireless link from the first wireless station to the management resource;

wherein the management resource is operative to generate first control information and second control information based on the first data and the second data, the method further comprising:

at the first wireless station, receiving the first control information and the second control information from the management resource;

executing the first control information at the first wireless access point, the first control information controlling operation of the first wireless access point communicating with the first mobile communication devices; and forwarding the second control information from the first wireless station over the second wireless connectivity to the second wireless station, the second control information controlling operation of the second wireless access point communicating with the second mobile communication devices.

* * * * *

UNITED STATES PATENT AND TRADEMARK OFFICE
CERTIFICATE OF CORRECTION

PATENT NO. : 11,503,487 B2
APPLICATION NO. : 16/700119
DATED : November 15, 2022
INVENTOR(S) : Saran Khalid and Perwaiz Akhtar It is certified that error appears in the above-identified patent and that said Letters Patent is hereby corrected as shown below:

In the Claims

Column 16, Line 38, Claim 2, replace "comprising;" with --comprising:--
Column 19, Line 52, Claim 23, replace "stations" with --station--
Column 19, Line 61, Claim 24, replace "throw h" with --through--

Signed and Sealed this
Tenth Day of January, 2023

Katherine Kelly Vidal
*Director of the United States Patent and Trademark Office*